United States Patent [19]

Bell et al.

[11] Patent Number: 4,615,562

[45] Date of Patent: Oct. 7, 1986

[54] REVERSIBLE CHILD RESTRAINT FOR AUTOMOBILES

[75] Inventors: Robert Bell, Solna; Stefan Westius, Spånga; Björn-Åke Sköld, Norrköping, all of Sweden

[73] Assignee: AB Akta Barnsakerhet, Sweden

[21] Appl. No.: 687,436

[22] Filed: Dec. 28, 1984

[30] Foreign Application Priority Data

Feb. 13, 1984 [EP]  European Pat. Off. ........ 84850051.8

[51] Int. Cl.$^4$ .............................................. A47D 1/10
[52] U.S. Cl. .............................. 297/250; 297/DIG. 2
[58] Field of Search ............... 297/250, 253, 254, 255, 297/256

[56] References Cited

U.S. PATENT DOCUMENTS

| | | | |
|---|---|---|---|
| 2,489,087 | 11/1949 | Hewit | 297/250 |
| 3,206,247 | 9/1965 | Johnson | 297/254 |
| 3,596,986 | 8/1971 | Ragsdale | 297/250 |
| 3,934,934 | 1/1976 | Farrell et al. | 297/250 |
| 4,345,791 | 8/1982 | Bryans et al. | 297/250 |
| 4,480,870 | 11/1984 | von Wimmersperg | 297/250 |

Primary Examiner—Francis K. Zugel
Attorney, Agent, or Firm—Burns, Doane, Swecker & Mathis

[57] ABSTRACT

This invention relates to a child restraint for automobiles which can be used either in a rearward facing or in a forward facing direction, and that can be moved from one configuration to another without mechanical adjustments. In order to obtain the possibility to use the child restraint both in a rearward facing direction and a forward facing direction the undersurface of the restraint seat includes a heel (13) at the back support (11) side of the seat undersurface, a toe (15) at the free end of the seat undersurface, and a concave curved slope (14) joining the heel (13) and the toe (15).

8 Claims, 6 Drawing Figures

REVERSIBLE CHILD RESTRAINT FOR AUTOMOBILES

This invention relates to a child restraint for automobiles which can be used either in a rearward facing or in a forward facing direction, and the use of such a restraint, including the movement of the restraint from one configuration to another without mechanical adjustments.

There are two principal types of child restraints described in the literature and represented on the market. Type I, first described by B Aldmann (1956) places the child in a position opposed to the direction of the vehicle's normal travel. The purpose of the Type I device is to interpose an impact absorbing surface between the child and the presumed direction of deceleration in a collision. These restraints are universally held in place by elaborate tie-down systems. The child is restrained by a safety belt of some kind. Restraints of Type I are often used in the front seat of the car. In those markets where this practice is encouraged (principally in the U.S. and in Scandinavia) this location is felt to improve parental control of the typically small child.

A second, competing design, which here is designated Type II, restrains the child in a configuration similar to that of other passengers. The child is seated facing forward in a relation to the direction of the vehicle's normal travel. The seating device is not in itself impact absorbing in Type II. Instead the device includes safety belts which restrain the child on impact. In most cases the child restraint is held in place by webbing or strapping, in some cases by so called tethers which are bolted into the car anterior to the back seat. Type II restraints are typically located in the rear seat. One variation of particular interest is the so called booster cushion. This restraint, which can visually resemble a tethered restraint, uses only the original equipment safety belts for child restraint and is sometimes only held in place by the original equipment safety belts.

One object of this invention is to combine Type I and Type II restraints in such a fashion that the restraint can be freely moved from rearward to forward facing configurations and from front to rear seat without modification or adjustment of any kind. The advantages to the user are that the product can unify the greater impact absorption and control features favoured for small children with the more adult-like seating favoured for larger children.

By exploiting common architectural features of the modern automobile the seat can be used without any permanent or semi-permanent mounting devices. As ease of use is critical for some users, this restraint does not require drilling or mounting of special tie-downs, either in Type I or Type II use. The term "architecture" as used in this description is to be taken to denote the totality of given design practice within a field or discipline. In the field of automotive design there has been a pronounced movement towards a mature architecture which is world-wide in its scope. Only ten or fifteen years ago cars of similar engine displacements could be radically different depending upon the company and country of origin. Today the maturation of automobile architecture has lead to the emergence of similar cars made by many companies. In fact the so called "world cars" are the most evident manifestation of this phenomenon.

The present invention relates to this maturation of automobile architecture. While the casual observer might remark that cars from different countries now look the same, the similarities in automobiles now extend beyond sheet metal into most engineering areas, as motor design, chassis design, accessory design and human factors design.

The design parameters affecting the interface between the child restraint and the automobile are the following: the type and shape of front and rear passenger seats, the depth and height of the dash board or facia (for Type I) and the depth and shape of the rear seat and the back of the front passenger seat (for Type II), the presence or absence of seat belts, the shape and size of the door openings.

Modern automobiles resemble one another internally as well, e.g. the measurements of the various parameters described above tend to cluster. The present invention exploits this clustering, this growing similarity, by closely matching the physical design of the child restraint to those areas and shapes of the automobile to which it must interface.

One critical interface aspect is the pitch and shape of the passenger seats upon which the restraint must rest. All automobile seats have a slope which describes, while unloaded, a mean value of about 15 degrees from the horizontal. The human passenger requires a support so that the posterior is lower than the thighs and knees. The automobile seat does not describe a plane, to which question we will return, but for the moment we can regard the angle as an issue on its own.

Now if a child restraint is designed with a given angle between the seat and back support, then the seating angle for the child will deviate roughly 30 degrees if the same seat is first placed in a Type I position and then rotated horizontally 180 degrees into a Type II position. This would seem to make comfortable seating for a child impossible without adjustment to the restraint itself.

There is a second aspect to the maturation of automobile seating architecture. Formerly, automobile seating was often of the bench style favoured in older U.S. and French automobiles. Modern cars universally use front seats which have a complexly curved surface. The universal features of this surface are: the outer seating surfaces are higher than the inner surface (called "thigh support"), the anterior half of the seat is more sharply angled than the posterior, the middle anterior surface is concave in its connection with the outer anterior surfaces. The rear seats are similar, but have less depth and in some cases lack an inner raised thigh support, while oftenmost retaining a support outermost, towards the door or side of the car.

In summary, the surfaces now common to mass produced car seats are:
 1. A raised anterior plane, for thigh support.
 2. A sunken posterior plane, for buttock support.
 3. Two raised side planes parallel to one another, with flat upper surfaces.

These surfaces interact as follows:
 1. The side planes join the anterior plane at the front, forming a rim or outer edge to the seating area.
 2. The side planes join the sunken posterior plane at the rear by means of sloping areas, which allow support and also the shifting of user weight from side to side without undo fatigue.
 3. The posterior plane and the anterior plane are joined by means of a convex curved slope.

This maturation of automobile seating architecture makes it possible to design the child restraint so that it can be used without complicated mounting devices.

The invention may be understood more readily and various other aspects and features of the invention may be apparent from the following description.

An exemplifying embodiment of the invention will now be described with reference to the accompanying drawings, wherein.

Figure 1:
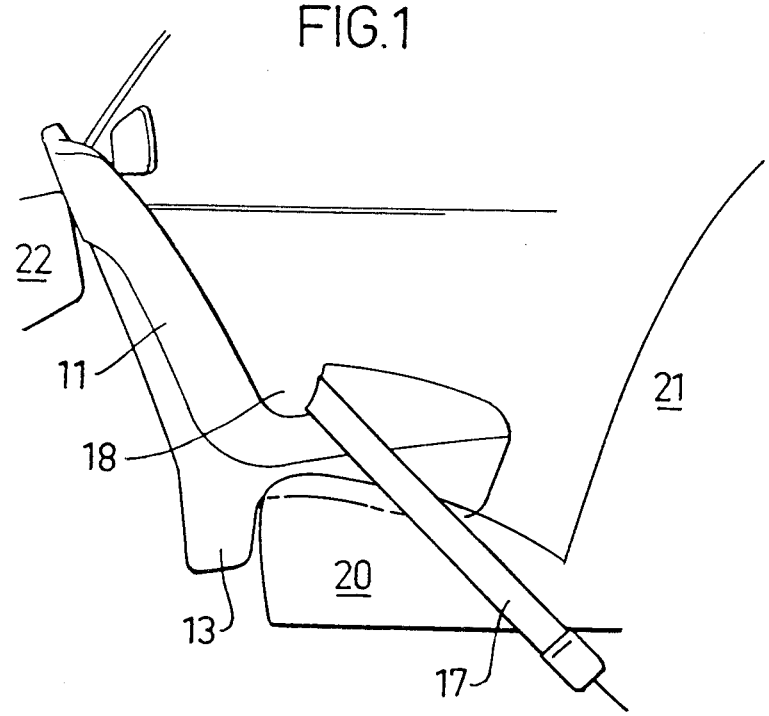
FIG. 1 is a side view showing the child restraint according to the invention used in a Type I configuration.

The child restraint 10 has a back support 11 and a seat 12. At the undersurface of the seat 12 at the back support side is provided a heel 13, which in the Type I configuration shown in FIG. 1 is positioned in front of anterior edge of the automobile seat 20. The undersurface of the restraint seat is also provided with a "sole" 14 and a "toe" 15 which both in the Type I configuration are resting on the automobile seat 20. In this configuration the back support 11 of the child restraint is resting against the dashboard 22 of the automobile.

Figure 2:
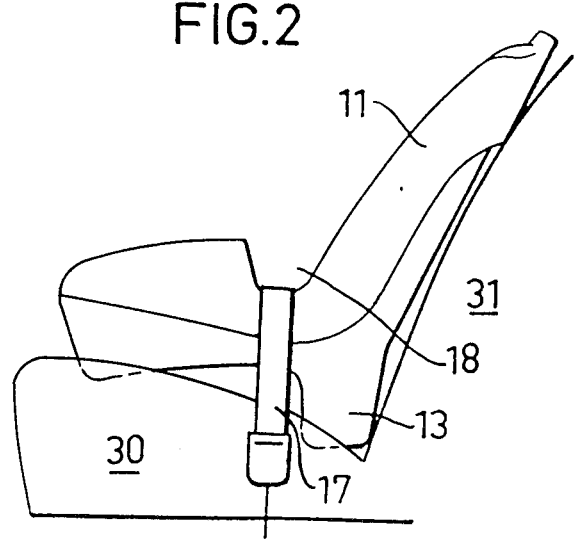
FIG. 2 is a side view showing the child restraint according to the invention used in a Type II configuration.

In FIG. 2 the child restraint 10 is shown in a Type II configuration, in which a child will be seated facing forward. The heel 13 of the restraint is now closest to the seat back 31, and the restraint is resting on the automobile seat 30 with its heel 13 and toe 15 surfaces but not with its sole 14. The height of the heel 13 is so dimensioned that the restraint seat 12 will have about the same seating angle in the Type II configuration as in the Type I configuration, and thus eliminating the angle deviation described above.

The present invention adapts the child restraint to the environment described by the passenger seat. The sole 14 and toe 15 of the restraint seat undersurface are complementary shapes to the three basic surfaces of the front passenger seat 20, namely:

1. The side surfaces of the restraint undersurface are curved to fit the slope of the side planes of the car seat.

2. The side and underside of the toe 15 of the undersurface mates the curves of the sunken posterior area of the car seat, and its most protuding segment in width matches the width of the sunken posterior area of the car seat.

3. The convex curved slope which joins the posterior and anterior planes of the car seat are mated by the concave curved slope, the sole 14, which joins the toe 15 and the heel 13 of the child seat undersurface.

The resultant effect is a high degree of fit between restraint and automobile seat. Together with the friction of a cloth covering on the underside, the shape of the underside affixes and stabilizes the restraint. The heel 13 with its broad innersurface adds additional friction vis-a-vis the front anterior surface of the passenger seat and thus support for the restraint.

In a forward facing configuration, FIG. 2, it is necessary that the base of the heel 13 and the toe 15 is narrower than the restraint itself, due to the need to nestle against the concave surfaces presented by the passenger seat. Both heel 13 and toe 15 must have broad bases to yield maximum friction in this configuration.

The angles and shapes defined by the intersection of windshield, dashboard and passenger seat are similar for most automobiles in the dominant 1 to 2 liter displacement classes. However, the back 11 of the child restraint must be sloped in such a way that it can yield maximum height and still be possible to position in a remove from the automobile. Maximum height means extended use of the product. This invention maximizes height by angling both seating 12 and back support 11 surfaces. In this way the length accomodated by the restraint is increased without increasing the volume of space occupied by the restraint.

Figure 3:
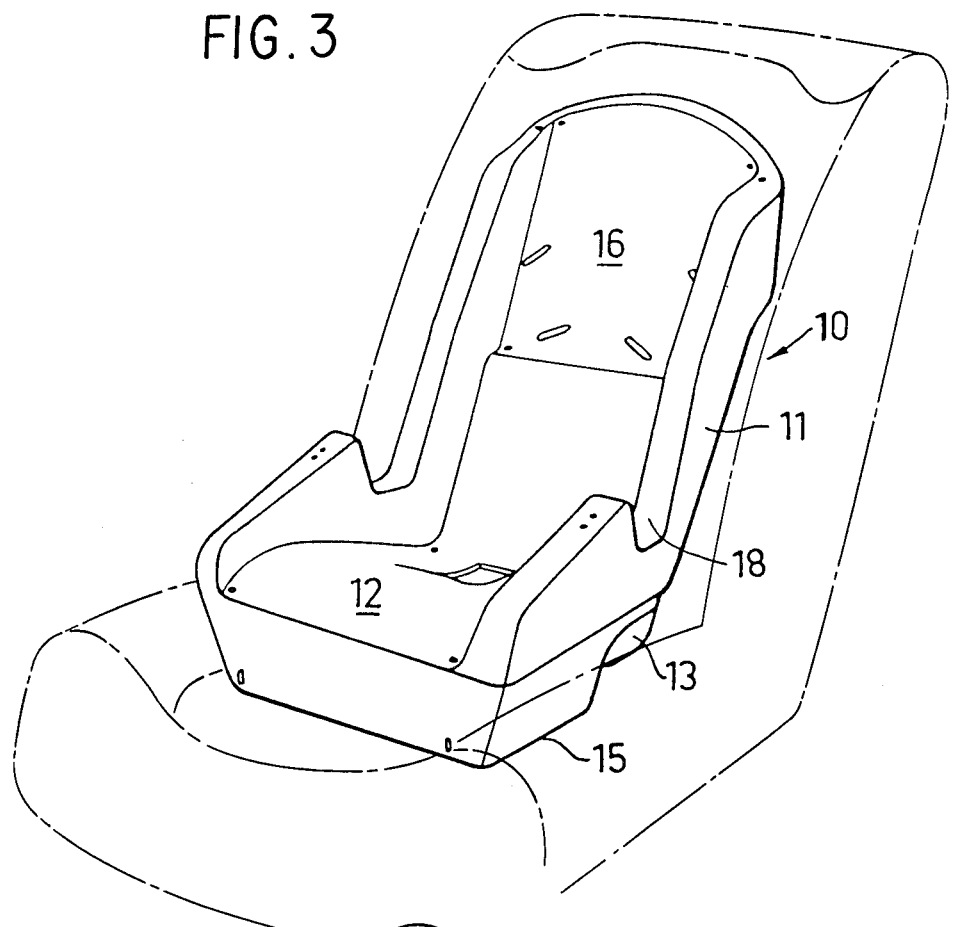
FIG. 3 is a perspective view showing the child restraint according to the invention from the front.
Figure 4:
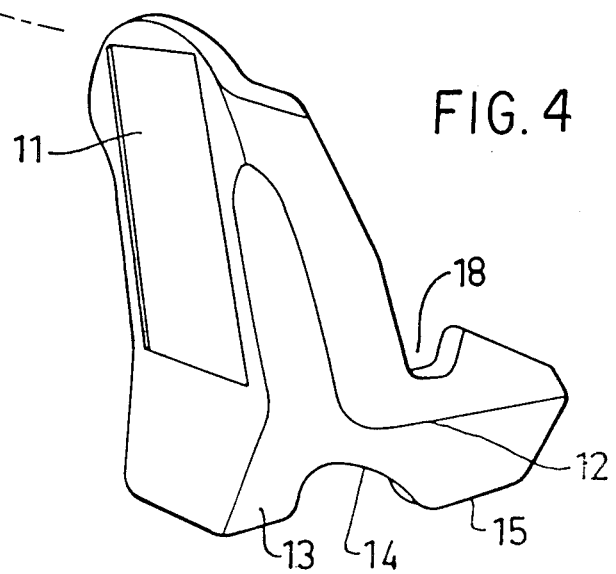
FIG. 4 is a perspective view showing the child restraint according to the invention from behind.
Figure 5:
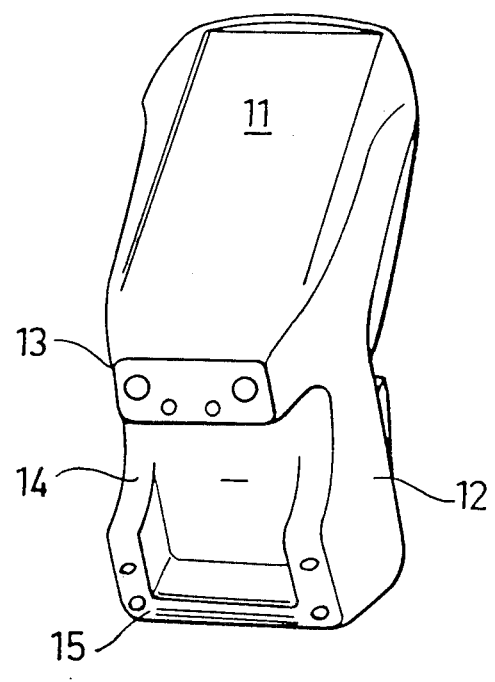
FIG. 5 is a perspective view showing the child restraint according to the invention from below.
Figure 6:
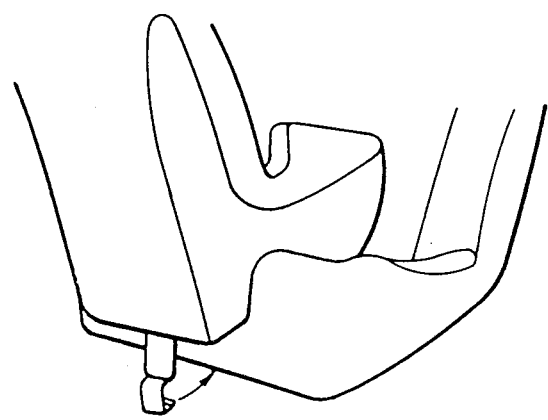
FIG. 6 is a perspective view showing one way of mounting the child restraint with an auxiliary mounting device.

If the angling of the back support 11 is dimensioned using correct measurements of children, a second important part of the invention becomes possible. All child restraints available hitherto have back supports shaped like kitchen chairs, e.g. they have upright straight backs. Children are notably non-planar in their lateral dimension. By angling the back support 11 by means of a sunken superior plane 16, FIG. 3, a considerable improvement in head restraint and thereby in support for a sleeping child is achieved.

Another common design factor in modern cars is the safety belt. In this invention the safety belt 17 is used to retain the restraint in the desired position in both configurations. In the side support of the child restraint is a recess 18 provided for receiving the automobile safety belt 17. In Type I use the child needs not to be restrained with a separate belt system. When the restraint is used as a Type II seat the separate belt can be used or the original equipment automobile safety belt. Actual practice must be left up to the regulatory authorities in the various countries. However, in some countries it is felt that the original equipment safety belt is an adequate restraint. The present invention allows the user to stow the separate belts for later use without removing any webbing. This feature allows the restraint to be easily shifted from one configuration to another.

Another important aspect of this invention concerns the method of fabrication. A prime material choice for impact absorbing devices, for example interior linings of sports or motor helmets, are the expanded cell materials, e.g. expanded polystyrene (EPS), expanded polyethylene or expanded polyurethane. Closed cell materials have unsurpassed characteristics as to impact absorption.

A second advantage in connection with this choice of material is that the product can be injection moulded in a single piece. The features of the seating area and the underside and rear surfaces of the child restraint are possible only with materials which allow extensive moulding of curved surfaces and openings. Such features could conceivably be fabricated with a number of discrete components and tools. However, in a consumer product economic constraints make it essential to mould the finished product in one piece.

The expanded cell materials have a well known drawback when exposed to catastrophic stress; they tend to shear and break apart. This invention deals with this drawback by means of a lamination process, by which the sunken areas are filled with fiber composite materials. This bonding adds considerable strength to the gross shape retention of the seat under stress. An unbonded seat will snap or break under load, while a bonded surface will hold. The complex shapes which define the various elements to the invention are made possible by this use of a cell plastic bonded with a fiber composite.

What we claim is:

1. A child restraint to be supported on the seat of an automobile in either a forwardly facing or a rearwardly facing direction, comprising:
   a back support, and
   a seat joined to said back support, said seat having an undersurface including means engaging a vertical anterior edge and an upper support surface of an automobile seat in a rearwardly facing position and engaging the automobile seat and seat back in a forwardly facing position, said means including a projecting heel portion and a toe portion, said heel portion being joined to said toe portion by a concave, curved portion; said heel portion having a surface that joins said concave, curved portion so that an offset is formed engaging said anterior edge of the automobile seat when the restraint is oriented in a rearwardly facing direction.

2. A child restraint according to claim 1, wherein:
   the heel portion projects from said concave curved portion a predetermined distance such that a seating angle of the restraint is approximately the same when the restraint is used in a forwardly facing direction as when used in a rearwardly facing direction.

3. A child restraint according to claim 1 for use with an automobile seat having a rearward slope, a sunken curved posterior area and upraised planar areas on each side of said posterior area, wherein:
   the undersurface has side areas curved to match the slope of the planar areas of the seat, said toe portion has sides and an underside portion formed to mate with said curved posterior area and said concave curve portion is formed to mate with the rearward slope of the automobile seat.

4. A child restraint as set forth in claim 1, wherein:
   the undersurface of said child restraint seat includes a cloth covering to increase friction and stability.

5. A child restraint according to claim 1, wherein:
   said back support forms an angle of greater than ninety degrees with said seat.

6. A child restraint according to claim 1, wherein:
   said back support has a sunken superior planar portion.

7. A child restraint according to claim 1, and further comprising:
   side supports joined to said seat, and recesses in said side supports for receiving an automobile safety belt.

8. a child restraint according to claim 1, wherein:
   said restraint is fabricated from a single molded piece of expanded cell material bonded with a fiber composite material.

* * * * *